US011158024B2

United States Patent
Bushell et al.

(10) Patent No.: US 11,158,024 B2
(45) Date of Patent: Oct. 26, 2021

(54) CONFIGURING ALPHA CHANNEL VIDEO BASED ON DISPLAY SETTINGS

(71) Applicant: Apple Inc., Cupertino, CA (US)

(72) Inventors: John S. Bushell, San Jose, CA (US); Mohammad A. Shah, Cupertino, CA (US); Sundararaman V. Shiva, Cupertino, CA (US); Alexandre R. Moha, Cupertino, CA (US); Nicholas V. Scapel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/814,332

(22) Filed: Mar. 10, 2020

(65) Prior Publication Data

US 2020/0380635 A1    Dec. 3, 2020

Related U.S. Application Data (60) Provisional application No. 62/855,702, filed on May 31, 2019.

(51) Int. Cl.
*G06T 1/20* (2006.01)
*G06F 3/14* (2006.01)

(52) U.S. Cl.
CPC . *G06T 1/20* (2013.01); *G06F 3/14* (2013.01)

(58) Field of Classification Search
CPC ................................. G06T 1/20; G06F 3/14
See application file for complete search history.

(56) References Cited

U.S. PATENT DOCUMENTS

| | | | |
|---|---|---|---|
| 2015/0121243 A1* | 4/2015 | Schmieder | G06F 9/452 715/740 |
| 2015/0186744 A1* | 7/2015 | Nguyen | H04N 19/17 382/190 |
| 2016/0078644 A1* | 3/2016 | Yue | G06T 1/20 382/199 |
| 2016/0140519 A1* | 5/2016 | Trepca | G06F 16/245 705/26.44 |
| 2017/0150213 A1* | 5/2017 | Cremer | H04N 21/4333 |
| 2019/0289305 A1* | 9/2019 | Messmer | G09G 5/02 |

OTHER PUBLICATIONS

C. Gartenberg, "Android Q's Dark Mode is Darker than the Battle of Winterfell", web page https://www.theverge.com/2019/5/7/18531550/google-android-q-dark-theme-mode-apps-io-2019; May 7, 2019; 2 pages.

* cited by examiner

*Primary Examiner* — Sarah Lhymn
(74) *Attorney, Agent, or Firm* — BakerHostetler (57) ABSTRACT

Systems and methods are disclosed for the rendering of contents communicated between devices. A source device processes a video sequence and transmits it to a target device together with metadata including rendering directives. At the target device, the received video sequence is rendered according to the rendering directives. Rendering is affected by events detected by the target device at the time of rendering or by the target device's information. Transparency masks, generated by the source device, are transmitted in an alpha channel to the target device, and are used for blending the video sequence with a secondary content.

21 Claims, 5 Drawing Sheets

CONFIGURING ALPHA CHANNEL VIDEO BASED ON DISPLAY SETTINGS

CROSS REFERENCE TO RELATED APPLICATION

This application claims the benefit of U.S. Provisional Application No. 62/855,702 filed on May 31, 2019, the disclosure of which is incorporated by reference herein.

BACKGROUND

Recent trends in communications via text messages embrace the use of artworks, either static or animated, to convey ideas or states of mind. Typically, artworks, sent by a source device, may consist of foreground regions, containing one or more graphical elements, and a background, e.g., of a plain color. A receiving target device may then render the artwork based on its current device settings.

BRIEF DESCRIPTION OF THE DRAWINGS

FIG. 1 illustrates artworks, 1A and 1C, sent by a source device, and respective versions of the artworks, 1B and 1D, as rendered by a receiving target device.

DETAILED DESCRIPTION

Figure 1A:
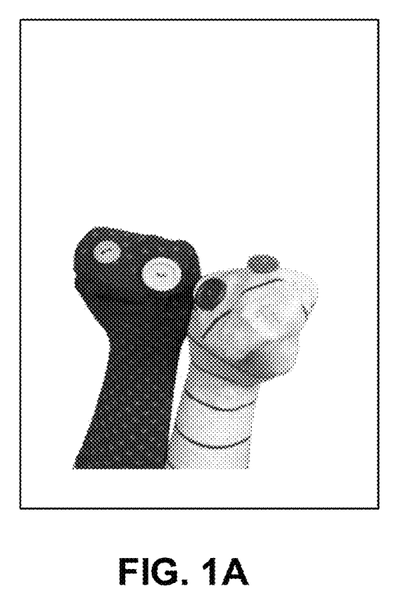
Figure 1B:
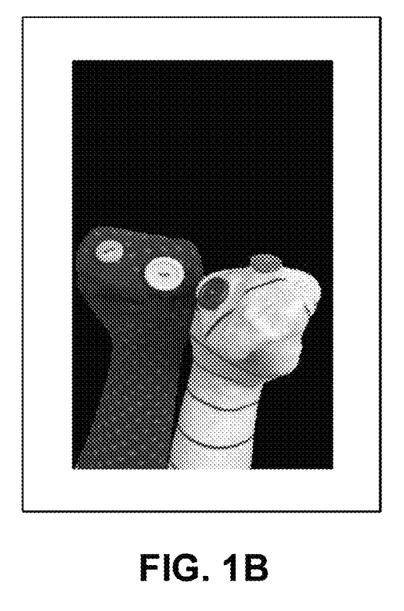
Figure 1C:
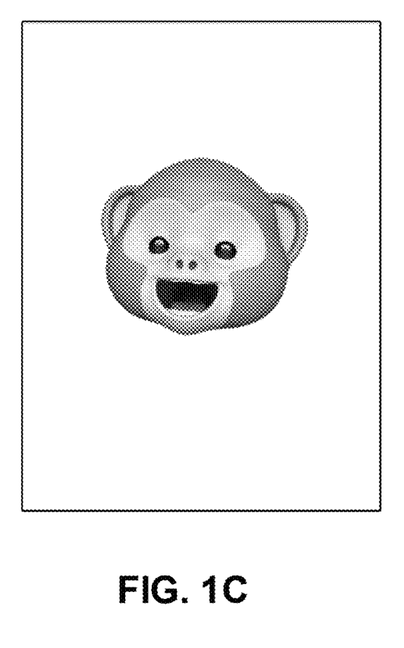
Figure 1D:
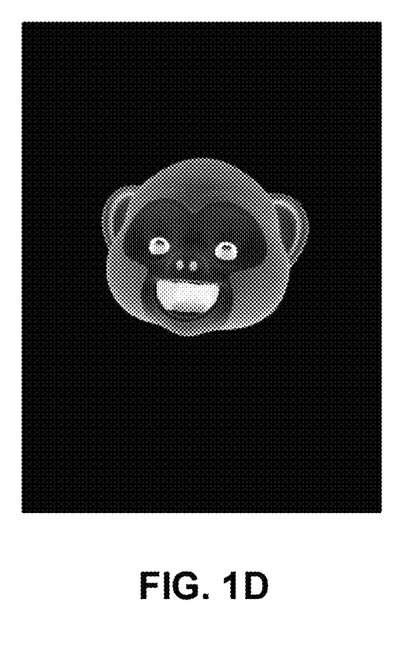

As discussed above, a source device may send artworks consisting of foreground regions, containing one or more graphical elements, and a background, e.g., of a plain color. A receiving target device may render the artwork based on its current device settings, possibly resulting in unexpected rendering effects, for example as demonstrated in FIG. 1A-D. For example, FIG. 1A shows the artwork as sent from the source device and FIG. 1B shows the sent artwork as may be rendered at the target device, having a background that does not match the background of the original artwork in FIG. 1A. Similarly, in FIG. 1D the colors of an artwork may be inverted in the target device relative to the original artwork sent by the source device, shown in FIG. 1C. This illustrated rendering result may be due to a particular setting (e.g., a setting that offers a dark system-wide appearance such as an "invert colors mode") of the target device. In such a mode, the system may adopt a darker color palette for one or more application windows, views, menus, and/or controls.

Aspects described herein disclose systems and methods for video rendering. In an aspect, at a source device, a video sequence may be coded and may be transmitted to a target device together with metadata. At the target device, the received video sequence may then be rendered according to the received metadata. In another aspect, the video sequence may be preprocessed, wherein transparency masks for frames of the video sequence may be generated; the transparency masks may be formed based on foreground and background regions within respective frames of the video sequence. The transparency masks may then be coded and may be transmitted in an alpha channel of the coded video data to the target device.

Aspects disclosed in the present disclosure also describe a video rendering method employed by a target device. In an aspect, the target device may receive coded video data comprising a video sequence and metadata providing rendering directives. The target device may retrieve information according to a rendering directive and may render the video sequence based on the retrieved information and the rendering directive. The information retrieved may be operational information of the target device (e.g., device settings) or information based on data measured or recorded by the target device. In another aspect, the target device may decode, from the received coded video data, transparency masks of respective frames of the video sequence, wherein the transparency masks are formed based on foreground and background regions of the respective frames. Then, the target device may blend the frames of the video sequence with a secondary content using blending ratios given by the transparency mask, wherein the secondary content may be a scalar color, an image, or video data.

Figure 2:
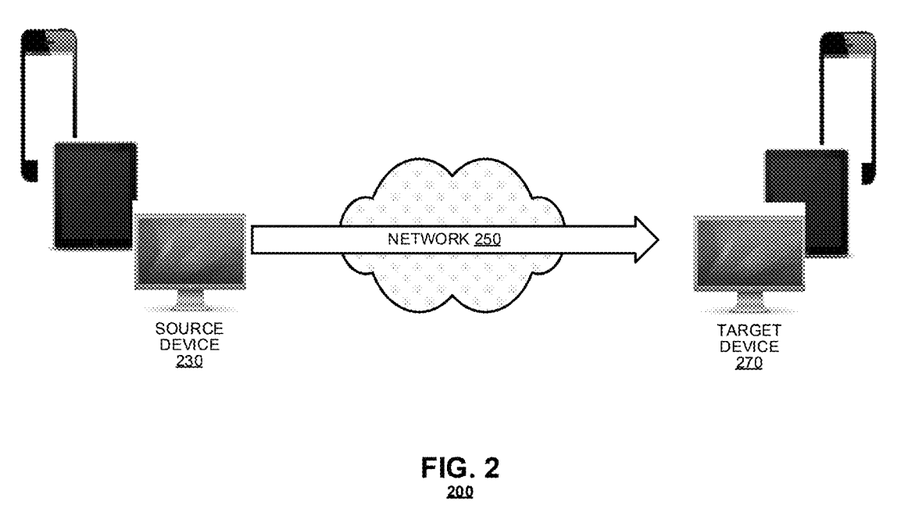
FIG. 2 illustrates a system for sending content processed by a source device to be rendered by a target device according to aspects of the present disclosure.

FIG. 2 illustrates a system 200 for rendering content according to aspects of the present disclosure. The system 200 comprises a source device 230, a network 250, and a target device 270. In an aspect, content—e.g., a video sequence (computer-generated graphics or content captured by a camera) or a static image—may either be received or generated by the source device 230. Such content may be sent by the user of the source device 230 to convey a message to the user of the target device 270. The target device 270 may further process the received content before displaying it to the user. In an aspect, the source device 230 may generate metadata containing rendering directives that may guide the target device 270 in rendering the transmitted content. In a further aspect, the source device 230 may generate transparency masks that may be used by the target device 270 to blend the received content with secondary content.

Figure 3:
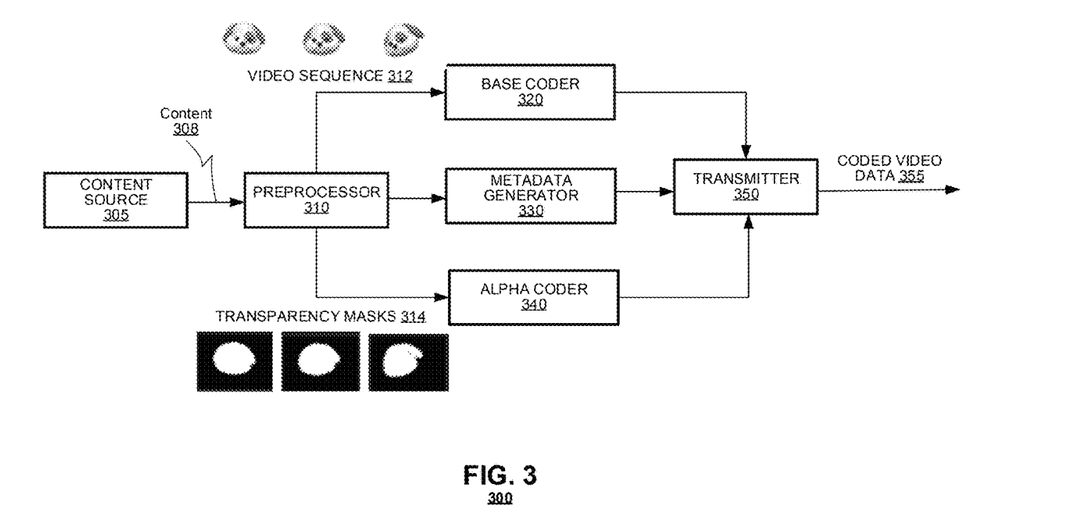
FIG. 3 illustrates a source device system for processing and transmitting content according to aspects of the present disclosure.

FIG. 3 illustrates a system 300 of the source device 230 according to aspects disclosed herein. In an aspect, the system 300 may comprise a content source 305, a preprocessor 310, a base coder 320, a metadata generator 330, an alpha coder 340, and a transmitter 350. The content source 305 may be a device camera, a device memory, or any device imbedded unit capable of capturing or generating content. Alternatively, the video source 305 may be external and/or remote to the source device 230. In an aspect, the content may be generated by the preprocessor 310. Thus, the preprocessor 310 may process content received from the content source 305 or may further process content that was generated by it.

The preprocessor 310 may process content 308 to prepare it for encoding, yielding a video sequence 312. In an aspect, the preprocessor 310 may employ other data analyses on the content, such as foreground or background detections that may be used to form transparency masks 314. These transparency masks may be used in the rendering process by the target device 270; pixel values from the transparency masks (i.e., blending ratios) may determine the way corresponding pixel values from the video sequence may be blended with corresponding pixel values from a secondary content. The secondary content may be a color scalar, an image, or a secondary video sequence, for example. The secondary content may be provided to the target device by the source device 230 as part of the metadata generated by the metadata generator 330. Alternatively, the metadata may provide a link to a secondary content that may be remotely accessible by the target device 270. In an aspect, the target device may independently select and, locally or remotely, access the secondary data to be blended with the received video sequence with respect to the received transparency masks.

In an aspect, the transparency masks 314 generated by the preprocessor 310 may be binary masks that differentiate between foreground and background regions within frames of the video sequence 312. To that end, pixel values of 1 in the transparency masks, corresponding to foreground regions of the video sequence, may allow for the rendering of the video content within these foreground regions. While pixel values of 0 in the transparency masks, corresponding to background regions of the video sequence, may allow for the rendering of a secondary content instead of the video content in these background regions. Alternatively, transparency masks need not be binary masks. In an aspect, transparency masks' values may be between 0 and 1 and may serve as blending ratios in a blending operation of the video sequence content with a secondary content. For example, a transparency mask, denoted by α(x,y), may result in the following rendering effect:

$$I_{rendered}(x,y) = \alpha(x,y) I_{original}(x,y) + (1-\alpha(x,y)) I_{secondary}(x,y) \quad (1)$$

wherein (x,y) may indicate a pixel location. Thus, the rendered content, denoted by $I_{rendered}(x,y)$, may be a weighted average of the video sequence, denoted by $I_{original}(x,y)$, and a secondary content, denoted by $I_{secondary}(x,y)$.

The metadata generator 330 may generate rendering directives to guide the rendering of the video sequence 312 at the target device 270. The rendering directives may be formed based on analyses of the content 308 that may be performed by the preprocessor 310. For example, rendering directives may contain various rendering controls, each associated with a certain target device's information or a certain event detected at the target device.

In an aspect, content 308 (e.g., video sequence) may be preprocessed by the preprocessor 310 or may be delivered as is to the base coder 320. The transparency masks may be generated by the preprocessor 310 and may be delivered to the alpha coder 340. The base coder 320 may code the video sequence 312 in a base channel and the alpha coder 340 may code the corresponding transparency masks in an alpha channel, e.g., according to an HEVC standard. Then, the transmitter 350 may pack the coded video sequence, the coded transparency masks, and the metadata (provided by the metadata generator 330) into a coded video data stream 355 and may transmit it to the target device 270 over the network 250.

Figure 4:
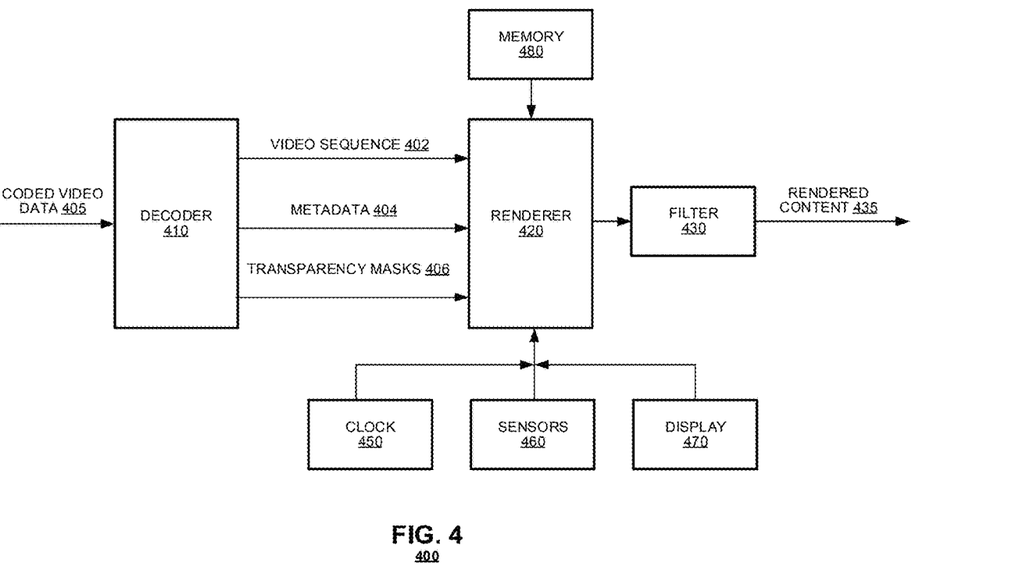
FIG. 4 illustrates a target device system for receiving and rendering content according to aspects of the present disclosure.

FIG. 4 illustrates a system 400 of the target device 270 according to aspects disclosed herein. In an aspect, the system 400 may comprise a decoder 410, a renderer 420, a filter 430, a clock 450, one or more sensors 460, a display 470, and a memory 480. The decoder 410 may receive coded video data 405 over the network 250 from the source device 230. The decoder may then decode the various channels, e.g., according to an HEVC standard, and may output a decoded version of the video sequence 402, a decoded version of the corresponding transparency masks 406, and the metadata 404 provided by the metadata generator 330. Then, the renderer 420 may render the received video sequence 402 according to rendering directives contained in the metadata 404. The output of the renderer 420 may be further processed by the filter 430 according to filtering parameters contained in the metadata 404, before displaying the rendered content 435 to the target device's user.

In an aspect, the renderer 420 may render the video sequence 402 based on rendering directives contained in the received metadata 404, wherein the rendering directives may be provided with respect to information retrievable by the target device 270 at the time of rendering. For example, the retrieved target device's information may be a device setting—e.g., a user interface setting, such as an invert colors mode, or a parameter related to the device display settings accessible from the device's memory 480 or the device's display 470. The retrieved target device's information may also be a time measurement, including a date 450. For example, a rendering directive may be comprising levels of brightness or variations of colors each to be applied at different times of the day or at different days of the year. In another aspect, a rendering directive may be associated with an event identifier; thus, when an event, identified by the event identifier, may be detected by the target device, such detection may result in the rendering of the video sequence according to that rendering directive. In yet another aspect, the retrieved target device's information is sensory data 460, comprising one of ambient light data, location data, orientation data, tactile data, audio data, or video data.

In an aspect, the renderer 420 may render the received video sequence 402 by incorporating a secondary content identified in the metadata 404, wherein the secondary content may be a caption, a figure, a graphical element, an image, or a video. In another aspect, the renderer 420 may render the received video sequence 402 by blending it with a secondary content according to the received transparency masks 406. As mentioned above, the secondary content or a link to it may be provided in the metadata 404, or, alternatively, the secondary content may be selected by the target device and may be accessed from the target device's memory 480 or otherwise may be accessible from a remote source.

The filter 430 may further process the output of the renderer 420 according to one or more fileting parameters contained in the metadata, yielding the rendered content 435. Instead, rendering directives in the metadata 404 may specify that no filtering may be applied and the rendered content 435 may constitute the output of the renderer 420. In an aspect, the filtering functionality may be integrated into the rendering operation employed by the renderer 420. The filter 430 may be employed based on information retrievable by the target device 270 at the time of rendering. In an aspect, the filter 430 may be employed in response to a detection of an event associated with an event identifier contained in the metadata. The detection of an event may be based on one or more of a device's settings stored in the memory 480, a time measurement 450, or sensory data 460, where the sensory data may comprise ambient light data, location data, orientation data, tactile data, audio data, video data, or a combination thereof.

Figure 5:
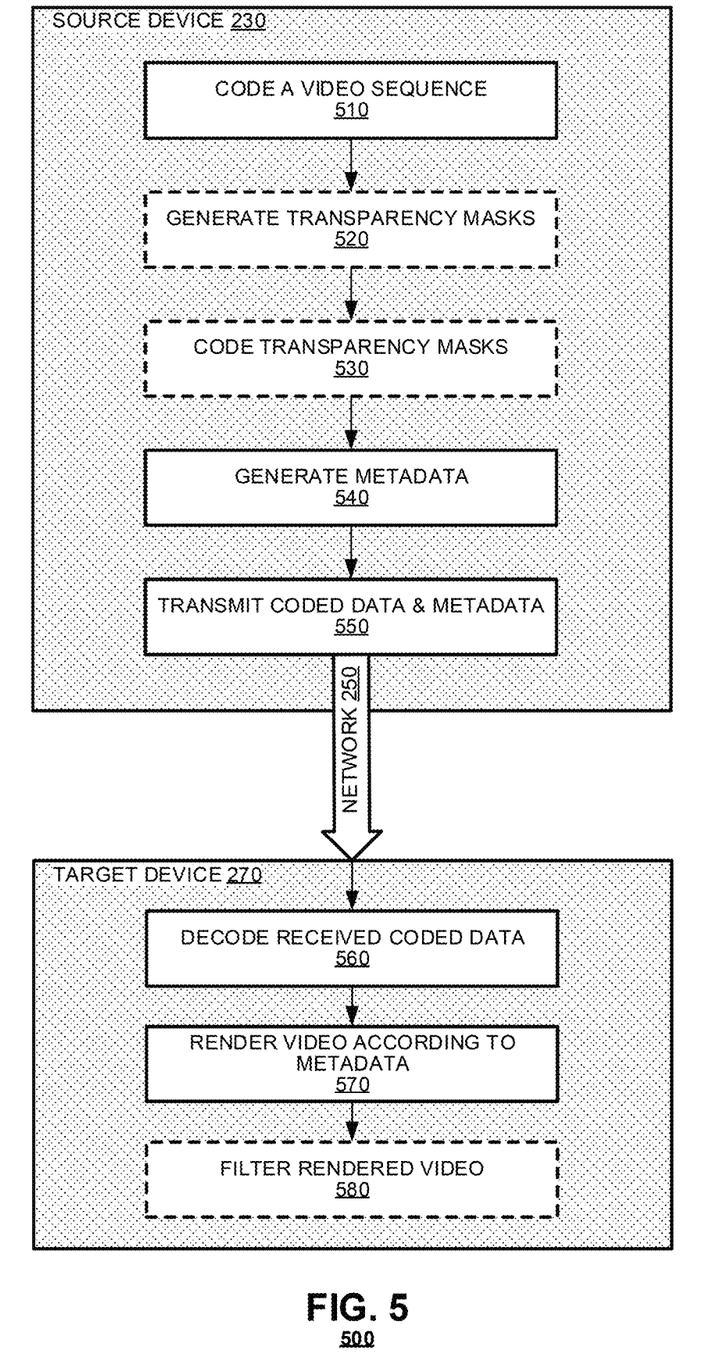
FIG. 5 is a functional block diagram illustrating processing and transmitting content, as well as receiving and rendering the content, according to aspects of the present disclosure.

FIG. 5 is a functional block diagram illustrating methods 500 employed by the source device 230 and the target device 270 according to aspects of the present disclosure. The source device 230 may employ processes comprising coding a video sequence 510, generating transparency masks 520, coding the transparency masks 530, generating metadata 540, and transmitting the coded data (coded video sequence and coded transparency masks) and the metadata 550, over the network 250, to the target device 270. The target device 270 may employ processes comprising decoding received coded data 560, yielding the video sequence 402, the transparency masks 406, and the metadata 404. The target device 270 may also employ processes comprising rendering the video sequence according to the metadata 570 and filtering the rendered video 580.

Hence, methods 500 disclosed herein may employ steps for delivering content and associated metadata from a source device 230 to a target device 270; the content delivered may be rendered according to rendering directives provided in the metadata, where the rendering directives may be determined 540 with respect to target device's information retrievable at the time of rendering. The steps of the methods disclosed 500 may be carried out by, and distributed between, applications of the source device 230 and the target device 270 in various combinations and orders. For example, in an aspect, a source device's application may generate transparency masks 520, or, alternatively, the transparency masks may be generated by a target device's application. In another aspect, filtering of the rendered video 580 may not be applied as may be directed by the rendering directives in the metadata.

In an aspect, content, conveying a source device user's message to a target device user, may be represented by a video sequence 312 and may be coded 510. The video sequence 312 may be processed, for example to generate corresponding transparency masks 520. As explained above, the transparency masks may be used to composite (blend) the video sequence with a secondary content when rendering 570 the video sequence at the target device. The transparency masks may be coded next in an alpha channel 530, e.g., according to an HEVC standard. Alternatively, the transparency masks may be generated by the target device. Either way, in accordance with rendering directives that may be created as part of the process for generating metadata 540, the target device may blend 570 the frames of the video sequence with a secondary content using blending ratios from corresponding pixel values in the transparency masks. In an aspect, the secondary content may be represented by a color value, by an image, or by a secondary video sequence. In another aspect, in accordance with rendering directives, the blending operation may be affected by information retrieved by the target device or events detected by the target device at the time of rendering.

Methods 500 may comprise techniques for generating metadata 540. Metadata generated by processes employed by the source device 230 may result in rendering directives to guide rendering processes 570 employed by the target device 270. In an aspect, rendering directives may be associated with a target device's information retrievable at the time of rendering, such as user interface settings. A target device's information may also be time measurements that may be associated with a rendering directive. Likewise, sensory data recorded by the target device at the time of rendering or stored in its memory may be tied to various rendering directives. For example, a location of the device (available by GPS and cellular localization technologies) may be used by aspects to direct rendering of content based on that location. Hence, the generated metadata 540 may include data records containing rendering directives, each record being associated with different target device's information retrievable at the time of rendering, such as a device setting, a time measurement, ambient light data, location data, orientation data, tactile data, audio data, or video data.

In an aspect, rendering directives may be associated with event identifiers. Hence, the process of generating metadata 540 may identify events, represented by event identifiers, for which the video sequence may be rendered according to associated rendering directives. Accordingly, responsive to an event identifier provided in the metadata, processes in the target device may detect that an event associated with that event identifier has occurred, and then may render the video sequence according to the corresponding rendering directive in the metadata 570. In an aspect, an event that is associated with an event identifier may be triggered based on a device setting, a time measurement, or sensory data—e.g., ambient light data, location data, orientation data, tactile data, audio data, video data—or a combination thereof.

Following rendering processes 570, or in integration with them, the rendered content may be further processed by the filtering process 580. This filtering may be in accordance with filter parameters (including filter type) determined by the metadata generating process 540. Then, the rendered and/or filtered content may be displayed to the user of the target device 270, or may be stored, or transmitted to other devices, for a later display.

As mentioned before, during the rendering process 570, the blending of the video sequence 402 with a secondary content may be employed using the received transparency masks 406. Alternatively, in an aspect, the blending of the video sequence with a secondary content may be employed using a predetermined blending function provided in the metadata 404. In another aspect, a video sequence 312 may be comprising color components (e.g., RGB or YUV) and rendering may be with respect to rendering directives associated with each color component. In such a case, for example, each color component may be rendered 570 with respect to its associated transparency masks or predetermined blending functions and may be filtered 580 with respect to its associated filter parameters.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A video processing method, comprising:
coding, at a source device, a video sequence and a transparency mask;
generating metadata comprising rendering directives with respective associated conditions based on operational information associated with a target device, wherein the respective rendering directives specify a compositing, to be performed at a target device when the associated condition is met at the target device, of the video sequence with a secondary content based on the transparency mask; and
transmitting coded video data, comprising the coded video sequence and the generated metadata, to the target device.

2. The method of claim 1 further comprising,
preprocessing the video sequence, the preprocessing comprises generating transparency masks corresponding to frames of the video sequence, wherein the transparency masks are formed based on foreground and background regions of the corresponding frames;
coding the transparency masks; and
transmitting the coded transparency masks with the coded video data to the target device.

3. The method of claim 1, wherein the video sequence is a computer-generated graphics or content captured by a camera.

4. The method of claim 1, wherein the metadata further comprising information identifying the secondary content to be used in the rendering of the transmitted coded video sequence, wherein the secondary content comprises one of a caption, a figure, a graphical element, an image, or a video.

5. The method of claim 1, wherein the metadata further comprising information identifying a filter parameter to be used in the rendering of the transmitted coded video sequence.

6. A computer system, comprising:
at least one processor;
at least one memory comprising instructions configured to be executed by the at least one processor to perform a method comprising:
coding, at a source device, a video sequence and a transparency mask;
generating metadata comprising rendering directives with respective associated conditions based on operational information associated with a target device, wherein the respective rendering directives specify a compositing, to be performed at a target device when the associated condition is met at the target device, of the video sequence with a secondary content based on the transparency mask; and
transmitting coded video data, comprising the coded video sequence and the generated metadata, to the target device.

7. The system of claim 6 further comprising,
preprocessing the video sequence, the preprocessing comprises generating transparency masks corresponding to frames of the video sequence, wherein the transparency masks are formed based on foreground and background regions of the corresponding frames;
coding the transparency masks; and
transmitting the coded transparency masks with the coded video data to the target device.

8. The system of claim 6, wherein the metadata further comprising information identifying a filter parameter to be used in the rendering of the transmitted coded video sequence.

9. A computer system, comprising:
at least one processor;
at least one memory comprising instructions configured to be executed by the at least one processor to perform a method comprising:
decoding, at a target device, received coded video data, yielding a video sequence, a transparency mask, and metadata, the metadata comprising rendering directives with respective associated conditions based on operational information of the target device, wherein the respective rendering directives specify a compositing, to be performed at the target device when the associated condition is met at the target device, of the video sequence with a secondary content based on the transparency mask;
retrieving operational information of the target device according to a selected rendering directive of the rendering directives; and
rendering the video sequence based on the retrieved operational information and the selected rendering directive.

10. The system of claim 9, further comprising:
decoding, from the received coded video data, transparency masks, wherein the transparency masks are formed based on foreground and background regions of respective frames of the video sequence, and blending the frames of the video sequence with a secondary content using blending ratios from the transparency masks, wherein the secondary content comprises one of a color, an image, or a video.

11. The system of claim 9, wherein the retrieved target device's information is one or more of a device setting, a time measurement, or sensory data, the sensory data comprising one of ambient light data, location data, orientation data, tactile data, audio data, or video data, or a combination thereof.

12. The system of claim 9, further comprising, responsive to an event identifier in the metadata,
determining when an event associated with the event identifier has occurred; and
responsive thereto, rendering the video sequence according to a corresponding rendering directive in the metadata.

13. The system of claim 9, wherein the rendering the video sequence further comprising, filtering the video sequence according to filter parameters provided in the metadata.

14. A non-transitory computer-readable medium comprising instructions executable by at least one processor to perform a method, the method comprising:
coding, at a source device, a video sequence and a transparency mask;
generating metadata comprising rendering directives with respective associated conditions based on operational information associated with a target device, wherein the respective rendering directives specify a compositing, to be performed at a target device when the associated condition is met at the target device, of the video sequence with a secondary content based on the transparency mask; and
transmitting coded video data, comprising the coded video sequence and the generated metadata, to the target device.

15. The medium of claim 14 further comprising,
preprocessing the video sequence, the preprocessing comprises generating transparency masks corresponding to frames of the video sequence, wherein the transparency masks are formed based on foreground and background regions of the corresponding frames;
coding the transparency masks; and
transmitting the coded transparency masks with the coded video data to the target device.

16. The medium of claim 14, wherein the metadata further comprising information identifying a filter parameter to be used in the rendering of the transmitted coded video sequence.

17. A non-transitory computer-readable medium comprising instructions executable by at least one processor to perform a method, the method comprising:
decoding, at a target device, received coded video data, yielding a video sequences, a transparency mask, and metadata, the metadata comprising rendering directives with respective associated conditions based on operational information of the target device, wherein respective rendering directives specify a compositing, to be performed at the target device when the associated condition is met at the target device, of the video sequence with a secondary content based on the transparency mask;
retrieving operational information of the target device according to a selected rendering directive of the rendering directives; and rendering the video sequence based on the retrieved operational information and the selected rendering directive.

18. The medium of claim 17, further comprising:

decoding, from the received coded video data, transparency masks, wherein the transparency masks are formed based on foreground and background regions of respective frames of the video sequence, and blending the frames of the video sequence with a secondary content using blending ratios from the transparency masks, wherein the secondary content comprises one of a color, an image, or a video.

19. The medium of claim 17, wherein the retrieved target device's information is one or more of a device setting, a time measurement, or sensory data, the sensory data comprising one of ambient light data, location data, orientation data, tactile data, audio data, or video data, or a combination thereof.

20. The medium of claim 17, further comprising, responsive to an event identifier in the metadata, determining when an event associated with the event identifier has occurred; and responsive thereto, rendering the video sequence according to a corresponding rendering directive in the metadata.

21. The medium of claim 17, wherein the rendering the video sequence further comprising, filtering the video sequence according to filter parameters provided in the metadata.

* * * * *